United States Patent Office 3,371,211
Patented Feb. 27, 1968

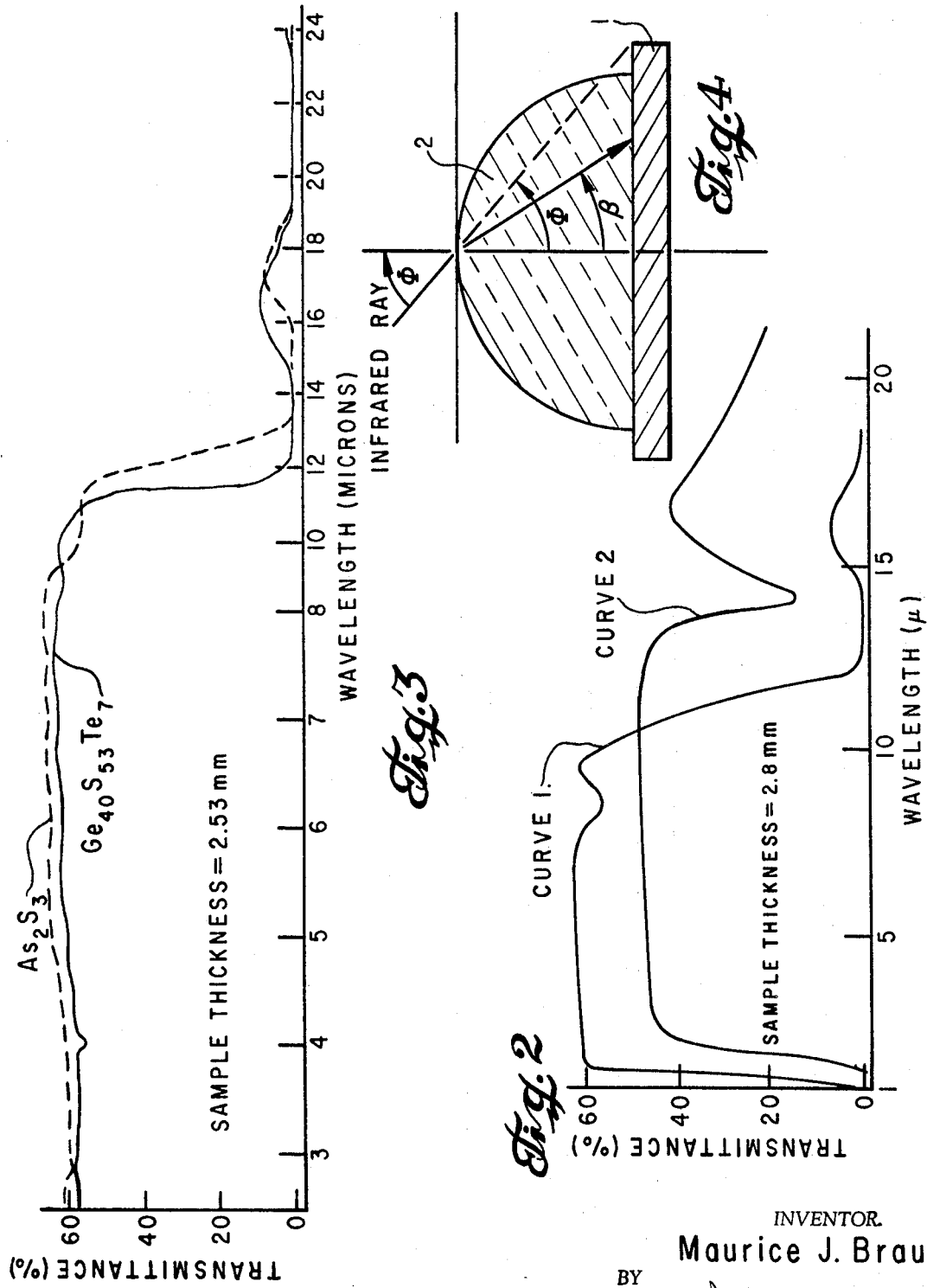

3,371,211
Ge-S-Te GLASS COMPOSITIONS AND
INFRARED DETECTION SYSTEM
Maurice J. Brau, Richardson, Tex., assignor to Texas Instruments Incorporated, Dallas, Tex., a corporation of Delaware
Continuation-in-part of application Ser. No. 425,887, Jan. 15, 1965. This application Apr. 22, 1965, Ser. No. 450,023
8 Claims. (Cl. 250—83)

ABSTRACT OF THE DISCLOSURE

Disclosed are compositions of matter comprising germanium, sulfur and tellurium, many samples of which have been found to be glasses transmitting in the infrared region of the electromagnetic spectrum, and some of which have been found to be crystalline. Also disclosed are methods of compounding these compositions, and an illustration of the use of the glass compositions of this invention as transmitting elements within an infrared detection system.

---

This is a continuation-in-part application of previously filed application, Serial No. 425,887, filed January 15, 1965 now abandoned.

This invention relates to amorphous glass compositions, these compositions being particularly useful in photodetective devices, especially infrared photodetective devices.

Detection systems responsive to light waves in the infrared region are today being developed for more and more military and civilian uses. As a result, the transmission of information in the infrared region of the energy spectrum has received increasing attention in recent years. For example, a variety of infrared detection systems has been developed each of which is composed generally of a detector having a responsive element sensitive to infrared energy and a transmitting element such as a lens or dome which, in addition to intercepting infrared rays at various angles of incidence and focusing them upon the responsive element of the detector, provides physical protection of the detecting element from its operating environment.

In order to fabricate these lenses or domes, therefore, a material is required which has certain desired characteristics. Of primary importance is the requirement that there be no interference with the transmission of the infrared energy to the responsive element of the detector. Consequently, the material must be substantially transparent over a broad range of the infrared spectrum. A second requirement of the material is that it have favorable physical characteristics. This entails having a relatively high softening or melting point, a good chemical durability against weathering, a high degree of hardness, a relatively low coefficient of expansion in order to withstand large thermal shocks without cracking or separating, and a high refractive index in order to improve the detection efficiency of an entire detecting system.

With these requirements in mind, many materials known in the art are unsuited for use as an infrared transmitting material for certain applications. For example, most of the synthetic crystalline infrared transmitters such as the alkali halides have excellent infrared transmission, ranging from 5 to as high as 50 microns, but they are highly sensitive to moisture, and generally possess poor chemical durability. Single crystals of silicon, selenium and germanium have upper wave lengths transmission limits of 20, 21 and 16 microns, respectively, but they are expensive and very difficult to fabricate into desired shapes and sizes. Silica glasses will transmit infrared radiation, but their useful transmission capability is limited to wave lengths out to 5 microns in 2 millimeters thickness. Various non-silicate glasses known in the art have also seen found to be transparent in the infrared region, but either their wave length transmission is limited or they are unsuitable due to their physical limitations.

For example, arsenic trisulfide, $As_2S_3$ falls within this class. Although having excellent transmission characteristics in the infrared region, being substantially transparent to infrared energy over a broad range of the energy spectrum (approximately 1–11 microns in wave length), it has very poor physical characteristics. The softening point of this glass composition is approximately 210° C., thus restricting its use at high temperature operation. Its thermal expansion has been measured at about $29.0 \times 10^{-6}/C°$; the material will therefore tend to fracture and separate when cooled quickly, causing the substance to be unable to withstand large thermal shocks during operation. It is also brittle and quite soft, having a Knoop hardness of only 109.

With these difficulties in mind, it is an object of this invention to provide amorphous glass compositions which, among other uses, will serve as infrared transmitting glasses, said compositions being substantially transparent over a broad range of the infrared spectrum.

It is another object of the invention to provide such compositions having favorable mechanical and physical properties.

It is another object of the invention to provide amorphous glass compositions capable of being heated to a molten state and easily molded into desired shapes and sizes.

It is a still further object of the invention to provide amorphous glass compositions suited for transmitting infrared energy, which are capable of withstanding a high degree of thermal shock.

In accordance with these objects, as well as other objects, advantages and features of this invention, amorphous glass compositions consisting of various atomic percentages of germanium, sulfur, and tellurium have been developed. The many uses of these compositions will be apparent to those skilled in the art. In accordance with particular characteristics, however they may be used for the fabrication of infrared transmitting elements in detection system, affording substantial improvement over many glass compositions presently being used for such purpose. In addition to being capable of transmitting infrared energy from approximately 1 micron to over 20 microns, the amorphous glass compositions of this invention have softening points ranging from 140° C. to 421° C., thermal coefficients of expansion as low as $14.0 \times 10^{-6}/C.°$, and possess relatively high Knoop hardnesses. These glasses, therefore, not only have excellent optical properties in the infrared region, but also superior physical properties, such as, for example, better mechanical strength, higher thermal stability, and the capability of withstanding large thermal shocks.

In particular, one of the amorphous glass compositions of this invention, $Ge_{40}S_{53}Te_7$, in addition to possessing all of the aforementioned advantages, has a special utility in the field of infrared detector systems. The efficiency of an infrared detecting system depends largely upon the ability of the dome or lens to intercept infrared rays of specified wave lengths at various angles of incidence and focus them upon the responsive element of the detector. This ability depends, in turn, upon the refractive index and the transmission characteristics of the dome. For this reason, most of the individual elements of the detecting system are designed in accordance with the refractive index and the transmission characteristics of the particular glass used as the infrared dome.

Arsenic trisulfide glass, possessing a favorably high refractive index (approximately 2.41 at $4\mu$) and excellent transmission characteristics within the 1–11 μ wave length band, has been widely used throughout the infrared industry in the fabrication of these devices. To replace this glass with another having a different refractive index or inferior transmission characteristics would constitute considerable expense and effort since, in view of what has been previously discussed, the entire detecting system would have to be redesigned.

The composition $Ge_{40}S_{53}Te_7$, however, not only possesses better physical properties than arsenic trisulfide and comparable transmission characteristics, but also has the identical refractive index of arsenic trisulfide glass (2.41 between 3–5 μ), thereby allowing the composition $Ge_{40}S_{53}Te_7$ to be directly substituted for arsenic trisulfide in the fabrication of the dome or lens for an infrared detecting system without redesigning the entire system. This means that a much superior glass may be used without any considerable increase in cost.

Accordingly, it is a specific object of the invention to provide an amorphous glass composition which not only has superior physical properties, but may also serve as a replacement glass for arsenic trisulfide in an infrared detecting system without the necessity of redesigning the entire system.

The novel features believed to be characteristic of this invention are set forth in the appended claims. The invention itself, however, as well as other objects and advantages thereof, may best be understood by reference to the following detailed description of illustrative embodiments, read in conjunction with the accompanying drawings, wherein:

FIGURE 2 is a graphical representation of percent transmission at room temperature at various wave lengths of the electromagnetic spectrum for various glass compositions of this invention;

Figure 1:
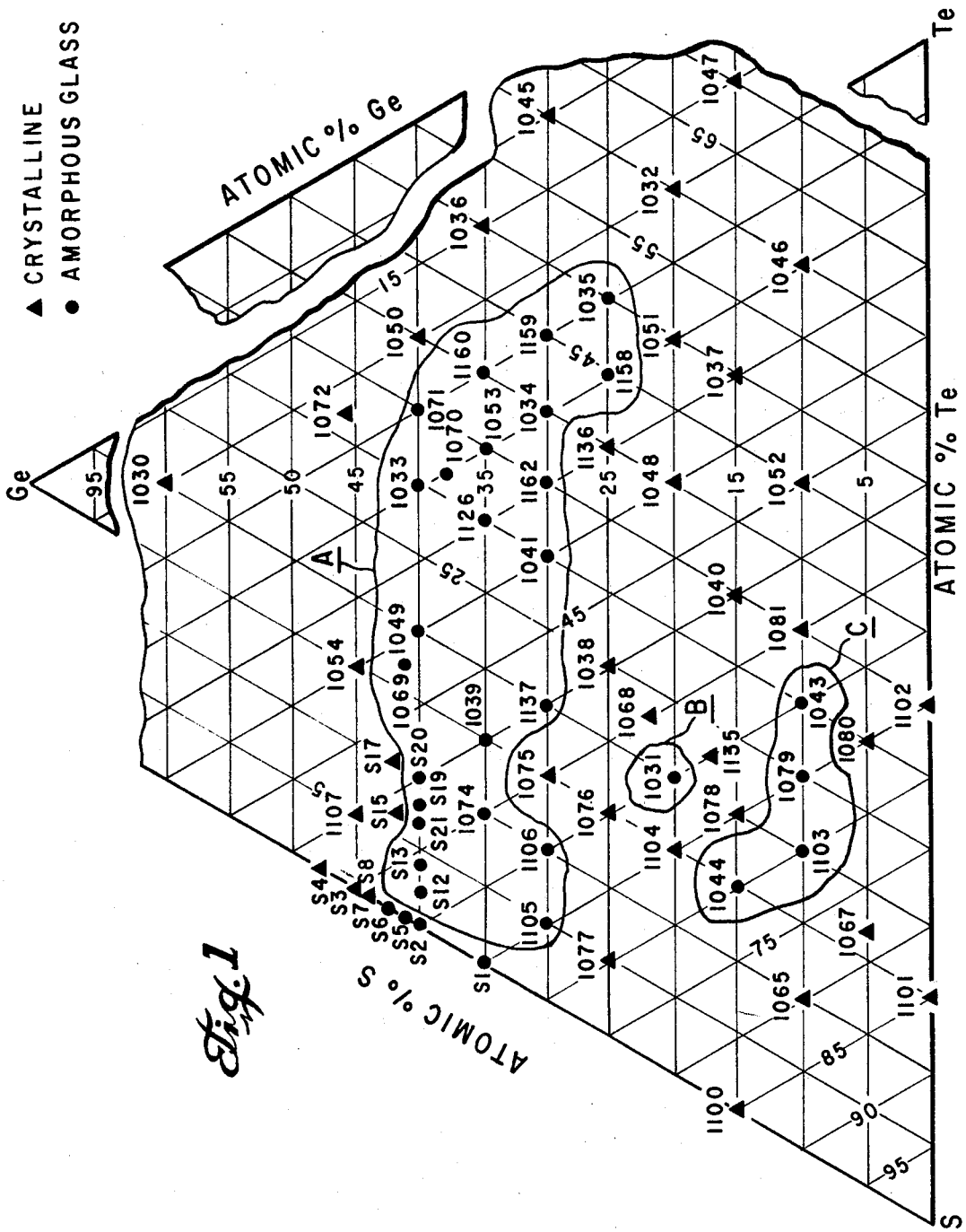
FIGURE 1 depicts a ternary diagram of the atomic percentages of germanium, sulfur, and tellurium for various amorphous compositions of matter of the invention.

FIGURE 3 is a graphical representation of percent transmission at room temperature at various wave lengths of the electromagnetic spectrum for $Ge_{40}S_{53}Te_7$ and $As_2S_3$, showing a comparison between the two; and FIGURE 4 illustrates one particular form of the glass compositions of this invention, usable as an infrared transmitting element, such as a dome or lens, within an infrared detection system.

Various atomic percents of germanium, sulfur and tellurium were chosen for each sample to be made. The appropriate amounts of the constituents were weighed and then placed in a previously cleaned quartz ampoule. For example, to form the glass composition $Ge_{40}S_{53}Te_7$, germanium, sulfur, and tellurium were measured according to the following proportions by weight: 52.8% germanium, 30.9% sulfur, and 16.3% tellurium. An example of a suitable cleaning step for the ampoule is by etching 30 minutes in a 10% solution of concentrated hydrofluoric (48% HF) acid, rinsing in deionized water about 15 minutes, treating with aqua regia, rinsing in deionized water, and then drying. An alternate method is brushing in a suitable detergent solution, thoroughly rinsing in deionized water, and then drying. The total weight of each sample was between five and fifteen grams. The constituents of each sample were placed in a cleaned tube and evacuated to about $10^{-4}$ torr and sealed. The sealed tubes of all samples were then placed in a furnace and gradually heated to a temperature of about 800–900° C. and held at that temperature for about 16 hours to provide sufficient time for the constituents to react completely with each other. The furnace was a rocking furnace which may be of any suitable design to provide agitation of the constituents so as to achieve complete reaction thereof. The samples were then removed from the furnace and held in a vertical position in air for air quenching and allowed to cool to room temperature. Care was taken throughout the process to prevent heating the constituents in air to avoid causing any oxide formation. In particular, in some cases the inside surface of the ampoule was carbon coated for the purpose of chemically reducing any extraneous oxides present.

The sample compositions which failed to form amorphous glass by the air quench-cooling technique and were crystalline after quenching are presented in Table I below, whereas the compositions which formed amorphous glass are presented in Table II below with the softening point results obtained for the glass. The softening point is defined at the temperature at which a pointed quartz rod under a 70 gram load penetrates a smooth surface to a depth of 0.05 mm. where the rod is in perpendicular alignment with respect to the sample and the point defines a 90° included angle. The reaction conditions for the samples in Tables I and II were the same:

TABLE I

| Sample No. | Composition, Atomic Percent | | |
|---|---|---|---|
| | Ge | S | Te |
| S-3 | 45 | 55 | |
| S-4 | 48 | 52 | |
| S-7 | 43 | 57 | |
| S-8 | 44 | 56 | |
| S-15 | 42 | 52 | 6 |
| S-17 | 42 | 48 | 10 |
| 1030 | 60 | 20 | 20 |
| 1032 | 20 | 20 | 60 |
| 1036 | 35 | 15 | 50 |
| 1037 | 15 | 35 | 50 |
| 1038 | 25 | 50 | 25 |
| 1040 | 15 | 50 | 35 |
| 1045 | 30 | 10 | 60 |
| 1046 | 10 | 30 | 60 |
| 1047 | 15 | 15 | 70 |
| 1048 | 20 | 40 | 40 |
| 1050 | 40 | 20 | 40 |
| 1051 | 20 | 30 | 50 |
| 1052 | 10 | 45 | 45 |
| 1054 | 45 | 40 | 15 |
| 1065 | 10 | 80 | 10 |
| 1067 | 5 | 78 | 17 |
| 1068 | 22 | 55 | 23 |
| 1072 | 46 | 22 | 32 |
| 1075 | 30 | 55 | 15 |
| 1076 | 25 | 60 | 15 |
| 1077 | 25 | 70 | 5 |
| 1078 | 15 | 65 | 20 |
| 1080 | 5 | 65 | 30 |
| 1081 | 10 | 55 | 35 |
| 1100 | 15 | 85 | |
| 1101 | | 85 | 15 |
| 1102 | | 65 | 35 |
| 1104 | 20 | 65 | 15 |
| 1107 | 45 | 50 | 5 |
| 1135 | 17 | 60 | 23 |
| 1136 | 25 | 35 | 40 |
| 1138 | 32 | 23 | 45 |

TABLE II

| Sample No. | Composition, Atomic Percent | | | Softening Point in °C. |
|---|---|---|---|---|
| | Ge | S | Te | |
| S-1 | 35 | 65 | | 315 |
| S-2 | 40 | 60 | | 415 |
| S-5 | 41 | 59 | | *400 |
| S-6 | 42 | 58 | | 370 |
| S-12 | 40 | 58 | 2 | 387 |
| S-13 | 40 | 56 | 4 | 379 |
| S-19 | 40 | 52 | 8 | 381 |
| S-20 | 40 | 50 | 10 | 345 |
| S-21 | 40 | 53 | 7 | 385 |
| 1031 | 20 | 60 | 20 | 239 |
| 1033 | 40 | 30 | 30 | 307 |
| 1034 | 30 | 30 | 40 | 179 |
| 1035 | 25 | 25 | 50 | 395 |
| 1039 | 35 | 50 | 15 | 396 |
| 1041 | 30 | 40 | 30 | 147 |
| 1043 | 10 | 60 | 30 | 140 |
| 1044 | 15 | 70 | 15 | 188 |
| 1049 | 40 | 40 | 20 | 353 |
| 1053 | 35 | 30 | 35 | 341 |
| 1069 | 41 | 42 | 17 | 360 |
| 1070 | 38 | 30 | 32 | 329 |
| 1071 | 38 | 26 | 36 | 300 |
| 1079 | 10 | 65 | 25 | 132 |
| 1103 | 10 | 70 | 20 | 149 |
| 1105 | 30 | 65 | 5 | 415 |
| 1106 | 30 | 60 | 10 | 421 |
| 1126 | 35 | 35 | 30 | 339 |
| 1137 | 30 | 50 | 20 | 177 |
| 1158 | 25 | 30 | 45 | 147 |
| 1159 | 30 | 25 | 45 | 207 |
| 1160 | 35 | 25 | 40 | 271 |
| 1162 | 30 | 35 | 35 | 162 |

*Approximate value.

In FIGURE 1, the peripheral lines A, B, and C generally circumscribe the amorphous compositions of germanium, sulfur, and tellurim according to the invention. The samples which failed to form amorphous glass by the air quench-cooling technique (listed in Table I) are plotted on FIGURE 1 by a block triangle and identified by sample numbers. The sample ternary compositions forming amorphous glass (listed in Table II) are also plotted in FIGURE 1 within the area generally circumscribed by lines A, B and C and designated by black dots, each dot being identified by a sample number. As may be seen from FIGURE 1, in the vicinity of binary glass examples S1, S2, S5 and S6, line A is substantially parallel to the Ge-S axis but does not include said binary glass examples, line A being directed to ternary glasses.

In FIGURE 2, the percent transmission of the electromagnetic spectrum at room temperature in the one to 20 micron wave length region is plotted for various of the glass samples listed in Table II. Curve 1 represents a "typical" set of transmission characteristics common to the amorphous glass compositions designated in FIGURE 1, excluding those amorphous compositions comprising 25 to 35 atomic percent germanium, 25 to 40 atomic percent sulfur, and 30 to 45 atomic percent tellurium. Curve 2 represents the transmission characteristics for these latter compositions, particularly $Ge_{30}S_{30}Te_{40}$, $Ge_{30}S_{40}Te_{30}$, $Ge_{25}S_{30}Te_{45}$, $Ge_{30}S_{25}Te_{45}$, $Ge_{35}S_{25}Te_{40}$, and $Ge_{30}S_{35}Te_{35}$.

The optical and physical properties of the amorphous glass compositions of this invention make them particularly suited, among other applications, for use as the transmitting element, such as a dome or lens, in an infrared detecting system. All of the compositions have relatively high indexes of refraction, ranging from approximately 2.4 to 3.3 at 3–5μ wave length. As previously noted with respect to FIGURE 2, there are two sets of "typical" transmission characteristics associated with the glass compositions of this invention. The compositions which are represented by Curve 2, particularly offer a distinct potential for the fabrication of optical hardware (lenses, prisms, domes, windows) to be used for long wave length (1–20μ) transmission.

Moreover, the amorphous compositions of the invention offer substantial advantages for the fabrication of the transmitting elements for a variety of other reasons. First, there is a wide range of physical properties from which the designer may choose. For example, the softening points range from approximately 140° C. to 421° C., and the Knoop hardnesses of the compositions have been measured from 104 to as high as 225. Second, these compositions offer substantial advantages over crystalline material, in that they may be heated to a plastic state and easily worked into desired shapes and sizes. Third, the reasonably high softening points and the available hardness offer greater ease in grinding, polishing and handling operations as well as stability to thermal shocks.

As previously mentioined, the amorphous composition $Ge_{40}S_{53}Te_7$ affords substantial improvement over arsenic trisulfide glass. In addition to having the same index of refraction (2.41 at 3–5μ wave length) and comparable transmission characteristics (as depicted by the two transmission curves shown in FIGURE 3), $Ge_{40}S_{53}Te_7$ possesses superior physical properties. The softening point has been measured at 385° C., substantially higher than the arsenic trisulfide glass composition, and is also capable of withstanding large thermal shocks, having a thermal coefficient of expansion of $14.0 \times 10^{-6}/C.°$. The composition $Ge_{40}S_{53}Te_7$ is also substantially harder than the arsenic trisulfide glass since it has a Knoop hardness of 225.

FIGURE 4 depicts a form of the glass compositions of this invention, particularly $Ge_{40}S_{53}Te_7$, for use within a particular infrared detecting system. The detecting system is normally composed of a detector 1 having a responsive element sensitive to infrared energy striking its surface, and an infrared transmitting element 2 such as a dome or lens in optical contact with the detector. It is presently known in the art to fabricate the detector from doped semiconductor materials usually having low energy gap characteristics. In accordance with the previous description the transmitting element 2 would be fabricated from a glass composition of this invention, for example $Ge_{40}S_{53}Te_7$. Consequently, when infrared rays strike the dome 2 at the incident angle Φ, the high index of refraction 2.41, of the dome material $Ge_{40}S_{53}Te_7$ causes the rays to be bent toward the detector unit 1 at the angle of refraction β, thus increasing the efficiency of detection. It is also to be observed that the dome or lens 2 provides physical protection of the detector 1 from its operating environment.

It should be understood that although most of the samples described above were essentially germanium, sulfur, and tellurium, minor percentages of silicon, phosphorus, antimony, arsenic, bismuth, etc. may be used in the glass of the invention to provide variations in the softening point and transmission of the glass compositions.

Although only the air quench-cooling method has been described for making the amorphous compositions of matter, other methods could be used. It is also to be appreciated that many other variations and changes in the invention will immediately suggest themselves to those skilled in the art, and such variations and changes are deemed to be within the purview and scope of the invention as defined in the appended claims.

What is claimed is:

1. A glass composition comprising in major proportion 18 to 23 atomic percent germanium, 57 to 63 atomic percent sulfur, and 17 to 23 atomic percent tellurium.

2. Ternary glass compositions as circumscribed by Lines A, B and C in the ternary diagram of FIGURE 1.

3. Ternary glass compositions consisting essentially of germanium, sulfur and tellurium and lying within line A of FIGURE 1.

4. Ternary glass compositions consisting essentially of germanium, sulfur and tellurium and lying within line B of FIGURE 1.

5. Ternary glass compositions consisting essentially of germanium, sulfur and tellurium and lying within line C of FIGURE 1.

6. A glass composition consisting essentially of by weight 52.8% germanium, 30.9% sulfur, and 16.3% tellurium.

7. An infrared detection system comprising a detector sensitive to infrared energy and a transmitting element in optical contact with said detector, said transmitting element consisting essentially of $Ge_{40}S_{53}Te_7$ glass.

8. Glass compositions consisting essentially of 25–35 atomic percent germanium, 25 to 40 atomic percent sulfur, and 30–45 atomic percent tellurium, said glass compositions having good transmission in the 1 to 20 micron wave length region of the electromagnetic spectrum and lying within line A of FIGURE 1.

References Cited

UNITED STATES PATENTS

| | | | |
|---|---|---|---|
| 3,214,241 | 10/1965 | Forber et al. | 23—134 |
| 3,261,721 | 7/1966 | Cornish | 23—315 X |

OTHER REFERENCES

Muyller et al., Limits of Glass Formation in the System As-S-Ge, Bull. Leningrad Univ., vol. 17 (1962), p. 146.

Weyl, Glass Formation in Non-Silicate Systems, J. Chem. Educ., September 1950, pp. 520 and 523.

HELEN M. McCARTHY, *Primary Examiner.*